US012628790B1

(12) United States Patent
Murff

(10) Patent No.: US 12,628,790 B1
(45) Date of Patent: May 19, 2026

(54) STALL JAC

(71) Applicant: James Edward Murff, Huntsville, TX (US)

(72) Inventor: James Edward Murff, Huntsville, TX (US)

( * ) Notice: Subject to any disclaimer, the term of this patent is extended or adjusted under 35 U.S.C. 154(b) by 0 days.

(21) Appl. No.: 19/383,462

(22) Filed: Nov. 7, 2025

Related U.S. Application Data

(63) Continuation of application No. 30/020,503, filed on Aug. 28, 2025.

(51) Int. Cl.
    *A01D 7/00* (2006.01)
    *A01K 1/01* (2006.01)
(52) U.S. Cl.
    CPC . *A01K 1/01* (2013.01); *A01D 7/00* (2013.01)
(58) Field of Classification Search
    CPC ... A01K 1/01; A01D 7/00; A01D 7/10; A01D 9/00; A01D 9/06; E01H 1/1206; A47L 13/06
    See application file for complete search history.

(56) References Cited

U.S. PATENT DOCUMENTS

| | | | |
|---|---|---|---|
| 825,461 A | 7/1906 | Hasseler | |
| 969,307 A | 9/1910 | Sumerlin | |
| 975,871 A * | 11/1910 | Kampfe | A01D 7/00 |
| | | | 56/400.15 |
| 1,031,958 A | 7/1912 | Osternd | |

| | | | |
|---|---|---|---|
| 1,189,987 A * | 7/1916 | Money | A01D 7/10 |
| | | | 56/400.05 |
| 1,234,110 A | 7/1917 | Albro | |
| 1,236,932 A | 8/1917 | Henrikson | |
| 2,787,882 A * | 4/1957 | Huley | A01D 7/10 |
| | | | 56/400.05 |
| 5,791,706 A | 8/1998 | Dolci | |
| 5,799,998 A * | 9/1998 | Gitterman, III | A01D 7/10 |
| | | | 294/51 |
| 6,039,369 A * | 3/2000 | Stahovic | E01H 1/1206 |
| | | | 294/1.4 |
| D434,288 S | 11/2000 | Todd | |
| 6,196,600 B1 * | 3/2001 | Miller | E01H 1/1206 |
| | | | 15/257.7 |
| 7,222,899 B1 | 5/2007 | Berto | |
| 8,172,287 B1 | 5/2012 | Watson | |
| 9,736,979 B1 | 8/2017 | Millard | |
| 2002/0167184 A1 | 11/2002 | May | |
| 2010/0117387 A1 * | 5/2010 | Axelrod | E01H 1/1206 |
| | | | 294/1.4 |
| 2013/0313842 A1 * | 11/2013 | McNair | E01H 1/12 |
| | | | 294/1.4 |
| 2020/0128793 A1 * | 4/2020 | Fredrickson | A01B 1/026 |

FOREIGN PATENT DOCUMENTS

| | | | | |
|---|---|---|---|---|
| GB | 2554886 A * | 4/2018 | | A01D 9/00 |

* cited by examiner

*Primary Examiner* — Monica L Perry
(74) *Attorney, Agent, or Firm* — Cooper & Assoc.; Mark L. Cooper

(57) ABSTRACT

A Stall Jac or stall rake which includes a plurality of tines having an elongated body portion extending away from, and engaged with an upper support, a distal end of a first group of the plurality of tines are unattached to each other, and the distal end of a second group of tines are attached to a scraping assembly extending between the distal end of the second group of tines and a lower edge of the head assembly.

20 Claims, 5 Drawing Sheets

FIG. 2
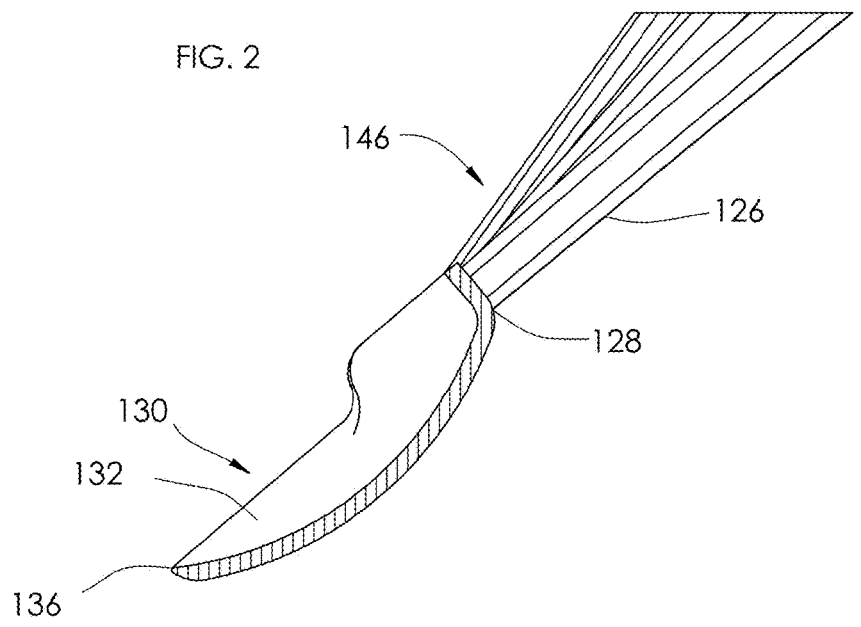
FIG. 3
FIG. 4
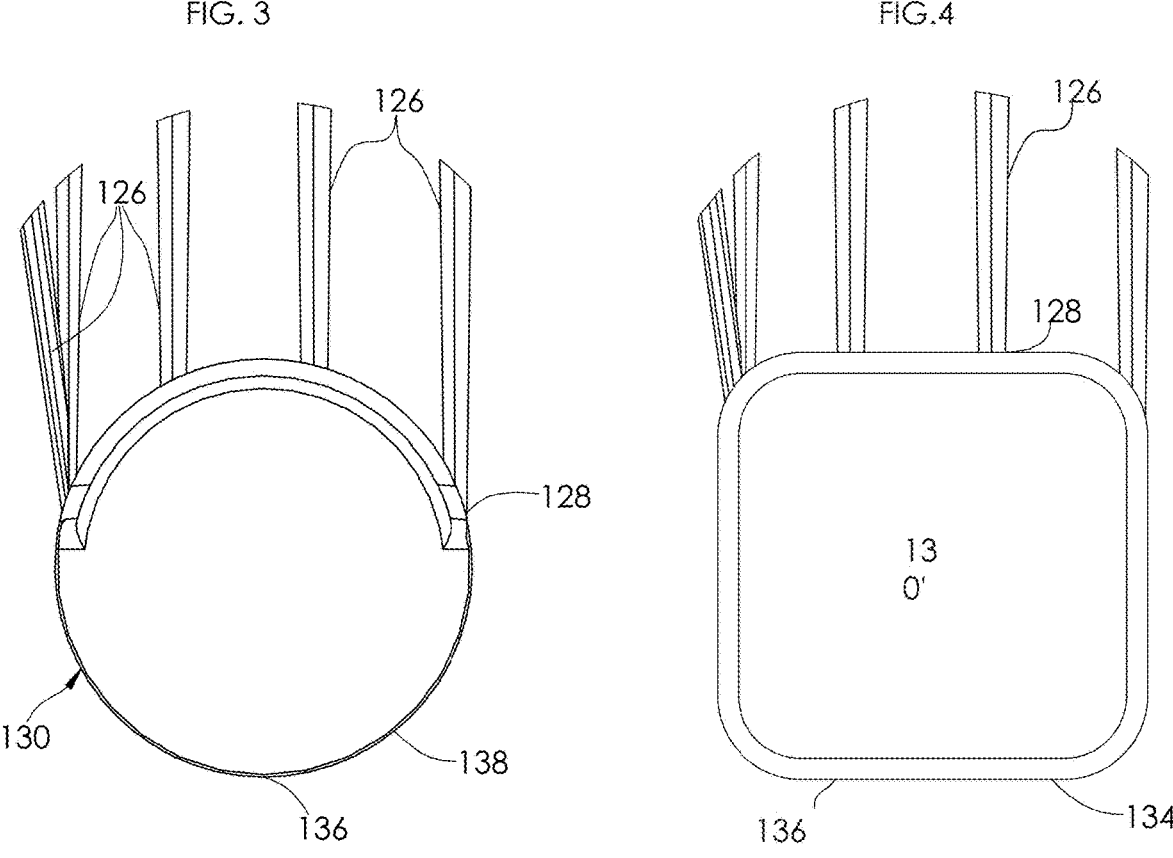

STALL JAC

RELATED APPLICATIONS

This application claims the benefit of U.S. Design patent application Ser. No. 30/020,503 filed Aug. 28, 2025, the entire disclosure of which is incorporated by reference herein.

FIELD

The instant disclosure is generally directed to a hand operated stall jac, also referred to as a stall rake. More particularly, to stall rake or stall jac for cleaning and maintaining animal stalls.

BACKGROUND

The present disclosure is directed to a stall rake suitable for conveniently and sanitarily scooping and disposing of debris, more specifically removing animal soiled hay or other bedding materials from animal stalls or other enclosures.

Manual cleaning of horse stalls or other livestock facilities is typically performed utilizing a manure fork, which consists of a fork head configured with a row of plastic or metal tines. A handle typically made of wood having a circular cross-sectional shape is attached to fork head for shoveling manure and raking bedding.

Manure forks known in the art are suitable for moving hay and other bedding, yet are ill suited to remove manure or other niceties present in animal stalls, and/or to dislodge materials from stall floors which need to be removed during the cleaning process. The Applicant has identified a need to improve the utility of stall rakes for use in maintaining animal habitats.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter. In embodiments, a stall rake comprises a head assembly attachable to an end of a handle, the head assembly comprising an upper support separated from a lower edge by an assembly length; the upper support having a length oriented transverse to the handle; a plurality of tines engaged with the upper support, each spaced apart from one-another along the length of the upper support, each of the plurality of tines having an elongated body portion extending away from the upper support along a tine length and terminating at a distal end, wherein the distal end of a first group of the plurality of tines define the lower edge of the head assembly; wherein the distal end of a second group of the plurality of tines are attached to a scraping assembly extending between the distal end of the second group of the plurality of tines and the lower edge of the head assembly.

In embodiments, a stall rake comprises a head assembly attached to an end of a handle, the head assembly comprising an upper support separated from a lower edge by an assembly length; a second support oriented parallel to the upper support located between the upper support and the lower edge along the assembly length; the upper support and the second support having a length oriented transverse to the linear handle; a plurality of tines, each engaged with the upper support and the second support, each spaced apart from one-another along the length of the upper support and the second support, each of the plurality of tines comprising a first portion disposed between the upper support and the second support, and a second portion disposed between the second support and the lower edge, wherein the second portion is oriented at an angle relative to the first portion and terminates at a distal end of the tine; wherein the distal ends of a first group of the plurality of tines defines the lower edge of the head assembly; wherein the distal end of a second group of the plurality of tines are each attached to a scraping assembly extending between the distal end of the second group of the plurality of tines and the lower edge of the head assembly; wherein the distal end of two or more of the second group of the plurality of tines are engaged with the same scraping assembly; wherein a lower outer edge of the scraping assembly located opposite to the distal end of the second group of the plurality of tines forms a portion of the lower edge of the head assembly; wherein the lower outer edge of the scraping assembly has a curved surface; wherein the scraping assembly comprises a concave surface oriented away from a front face of the head assembly; wherein the upper support and the second support each include a center portion disposed between two outer portions, each outer portion engaged with a corresponding end of the center portion, wherein each outer portion is oriented at an angle relative to the center portion; wherein the head assembly comprises at least two cleaning assemblies; wherein two of the cleaning assemblies are located on opposite ends of the lower edge of the head assembly, and wherein the upper support is frictionally engageable or threadedly engageable with the end of the linear handle.

Such embodiments are shown in and/or described in connection with at least one of the figures, as set forth more completely in the claims. Various advantages, aspects and novel features of the present disclosure, as well as details of an illustrated embodiment thereof, will be more fully understood from the following description and drawings.

DESCRIPTION OF THE DRAWINGS

So that the manner in which the above recited features of embodiments of the instant disclosure can be understood in detail, a more particular description of the embodiments, briefly summarized above, may be had by reference to embodiments, some of which are illustrated in the appended drawings. It is to be noted, however, that the appended drawings illustrate only illustrative embodiments of this disclosure and are therefore not to be considered limiting of its scope, for the invention disclosed herein may admit to other equally effective embodiments.

FIG. 2 is a cross-sectional view along A-A of FIG. 1.

FIG. 3 is an enlarged view of a scraping assembly according to embodiments disclosed herein.

FIG. 4 is an enlarged view of an alternative scraping assembly according to embodiments disclosed herein.

Figure 1:
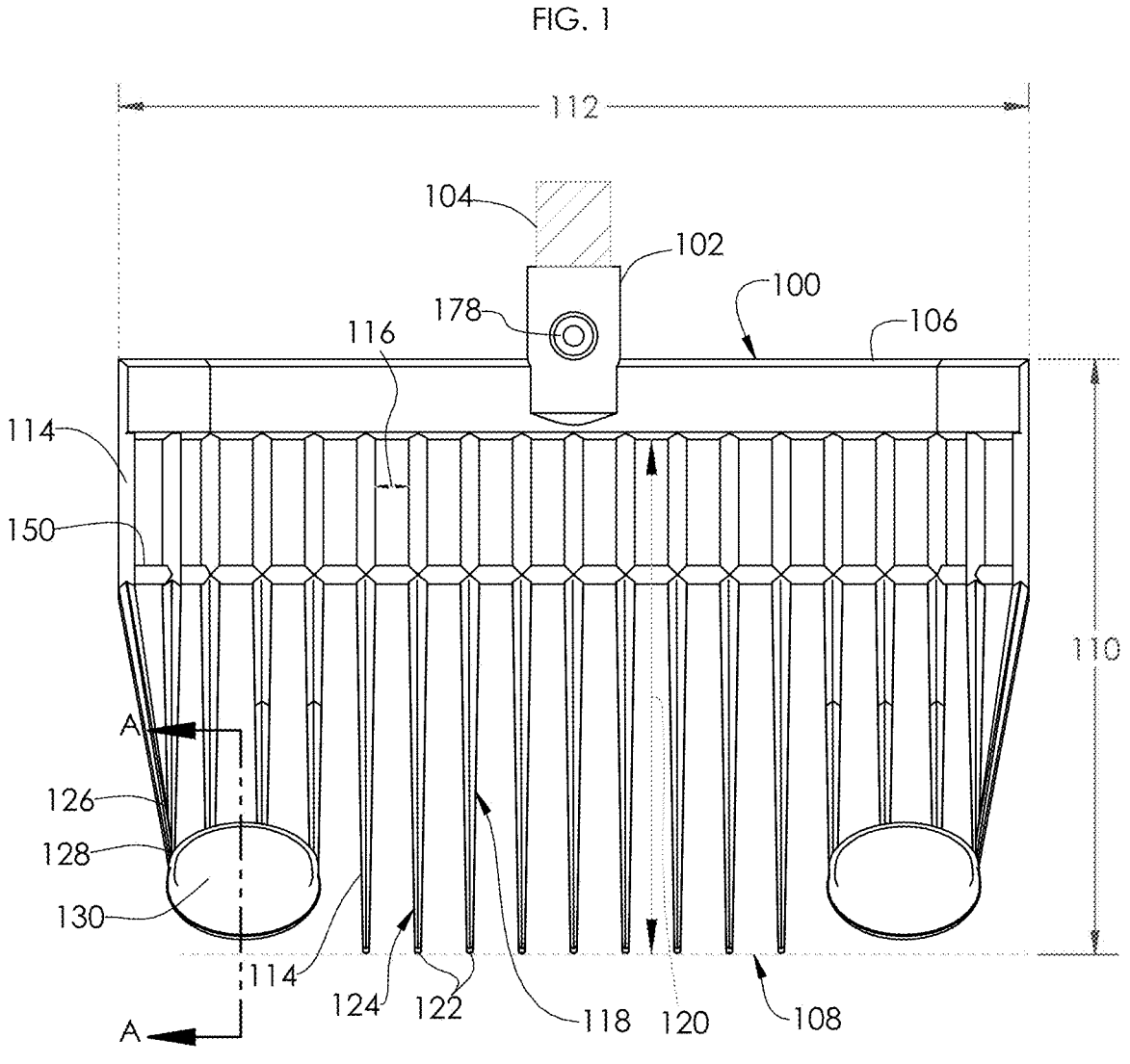
FIG. 1 is frontal view of a head assembly of a stall rake according to embodiments disclosed herein.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

At the outset, it should be noted that in the development of any such actual embodiment, numerous implementation-specific decisions must be made to achieve the developer's specific goals, such as compliance with system related and business-related constraints, which will vary from one implementation to another. Moreover, it will be appreciated that such a development effort might be complex and time-consuming but would nevertheless be a routine undertaking for those of ordinary skill in the art having the benefit of this disclosure. In addition, the composition used/disclosed herein can also comprise some components other than those cited. In the summary and this detailed description; each numerical value should be read once as modified by the term "about" (unless already expressly so modified) and then read again as not so modified unless otherwise indicated in context. Likewise, each limitation of an embodiment should be read once as comprising that embodiment, then again as consisting essentially of that embodiment, then again as consisting of that embodiment, unless otherwise indicated. For brevity, the term comprising is used throughout unless otherwise indicated.

The following definitions are provided in order to aid those skilled in the art in understanding the detailed description.

As used herein, a tine refers to a prong or other appendage of a rake or forklike tool. For purposes herein, a tine does not necessarily terminate in a point or have a pointed end.

As used in the specification and claims, "near" is inclusive of "at."

For use herein, the expressions "have", "may have", "include", "comprise", "may include", and "may comprise" indicate the existence of corresponding features (e.g., such as numeric values, functions, operations, or components) but do not exclude the presence of additional features.

In the present disclosure, expressions such as, "A or B" represent an alternative selection which, for example, refer to the case (1) where A is included or (2) where B is included, but does not represent the case where both A and B are included.

In the present disclosure, expressions such as, "A and/or B", "at least one of A and/or B", "one or more of A and/or B", and the like, refer to a case which may include any and all combinations of one or more of the associated listed items. For example, the terms "A and/or B", and "at least one of A or B" may refer to the case (1) where A is included, (2) where B is included, or (3) where both A and B are included.

Terms such as "first", "second", and the like used herein may refer to various elements of various embodiments disclosed herein, but it is to be understood that these labels do not limit the elements to any particular order, amount, or importance; such terms are used only to distinguish an element from another element and do not limit the order and/or priority of the elements. Likewise, such terms are used relative to others and do not represent absolute location, place, or order. For example, without departing from the scope of the present disclosure, a first element of one embodiment may be referred to as a second element in another embodiment, and similarly, a second element may be referred to as a first element.

In embodiments, a stall rake comprises a head assembly attachable to an end of a handle, the head assembly comprising an upper support separated from a lower edge by an assembly length; the upper support having a length oriented transverse to the handle; a plurality of tines engaged with the upper support, each spaced apart from one-another along the length of the upper support, each of the plurality of tines having an elongated body portion extending away from the upper support along a tine length and terminating at a distal end, wherein the distal end of a first group of the plurality of tines are not attached to one another, e.g., free, able to move independent of one-another, and in embodiments, define the lower edge of the head assembly; wherein the distal ends of a second group of the plurality of tines are attached to a scraping assembly extending between the distal end of the second group of the plurality of tines and the lower edge of the head assembly. In other words, two or more distal ends of the second group of the plurality of tines are attached to one another through the scraping assembly.

In some embodiments, the distal end of two or more of the second group of the plurality of tines are engaged with the same scraping assembly. In embodiments, the scraping assembly comprises a concave surface. In some embodiments, a lower outer edge of the scraping assembly located opposite to the distal end of the second group of the plurality of tines forms a portion of the lower edge of the head assembly, and the lower outer edge of the scraping assembly has a curved surface. In some embodiments, the scraping assembly comprises a concave surface oriented away from a front face of the head assembly.

In embodiments, the upper support of the head assembly includes a center portion engageable with the end of a handle, which is disposed between two outer portions, each outer portion engaged with a corresponding end of the center portion, wherein each outer portion is oriented at an angle relative to the center portion.

In embodiments, the distal end of the first group of the plurality of tines comprises a frustoconical shape or a conical shape. In some embodiments, the distal end of the first group of the plurality of tines comprises a chisel shaped terminal edge.

In embodiments, the head assembly includes at least two scraping assemblies, wherein two of the scraping assemblies are located on opposite ends of the lower edge of the head assembly.

In embodiments, the head assembly further comprises a second support engaged with the plurality of tines, wherein the second support is located between the upper support and the lower edge along the tine length. In some of such embodiments, one or more of the plurality of tines comprise a first portion disposed between the upper support and the second support, and a second portion disposed between the second support and the lower edge, wherein the second portion is oriented at an angle relative to the first portion.

In embodiments, the elongated body portion of one or more of the plurality of tines has a circular cross section. In some embodiments, the elongated body portion of one or more of the plurality of tines has an angular or triangular cross section. In some embodiments, the elongated body portion of one or more of the plurality of tines has a square or rectangular cross section. In embodiments, a first portion of the elongated body portion of the tines may have a different cross section compared to a second portion of the elongated body of the same tine. For example, a first portion may have a square or rectangular cross section, and another portion of the same tine may have a round or oval cross section and/or an angular cross section, which tapers down to a blunted or rounded point.

In embodiments, the upper support comprises a receiver and/or a hole disposed therethrough, dimensioned and arranged to frictionally engage the end of the handle. In some embodiments, the upper support comprises a handle receiver and/or a hole disposed therethrough, comprising threads dimensioned and arranged to threadedly engage a corresponding threaded end of the handle.

In embodiments, at least a portion of the head assembly is formed from metal. In embodiments, one or more of the plurality of tines are releasably engaged with the upper support and/or a secondary support. In some embodiments, the scraping assembly is releasably engaged with the distal end of the second group of the plurality of tines.

FIG. 1 depicts a frontal view of a head assembly 100 of a stall rake according to embodiments disclosed herein, wherein the head assembly 100 is attachable, e.g., via a receiver 102 or other attachment assembly to an end of a handle 104, only a portion of which is shown. The head assembly 100 further comprising an upper support 106 separated from a lower edge (indicated by hashed line 108) by an assembly length 110. The upper support 106 having a length 112, e.g., a width of the head assembly 100, oriented transverse to the direction or orientation of the handle 104. The head assembly 100 further including a plurality of tines 114, only a few being indicated for clarity, engaged with the upper support 106, each of the plurality of tines 114 being spaced apart 116 from one-another along the length 112 of the upper support 106. Each of the plurality of tines 114 having an elongated body portion 118 extending away from the upper support 106 along a tine length 120 and terminating at a distal end 122. The plurality of tines 114 may be divided into two or more groups, e.g., a first group 124 and a second group 126 of the plurality of tines 114. In embodiments, the first group exemplified by the tine labeled 124 in FIG. 1, extends from the upper support 106 to the lower edge 108, terminating in an unattached distal end 122. As shown in FIG. 1, the distal ends 122 of the first group 124 of the plurality of tines 114, define the lower edge 108 of the head assembly 100. The plurality of tines 114 of the head assembly 100 may further include a second group 126 of the plurality of tines 114, as exemplified by the tine labeled 126 in FIG. 1, in which the distal ends 128 of each of the second group 126 of the plurality of tines 114 are attached to, e.g., engaged with, a scraping assembly 130 extending between the distal end 128 of the second group 126 of the plurality of tines 114 and the lower edge 108 of the head assembly 100.

As shown in FIG. 1, in embodiments, the distal end 128 of two or more of the second group 126 of the plurality of tines 114 are engaged with the same scraping assembly 130. As shown in FIG. 1, five (5) of the second group 126 of the plurality of tines 114 are engaged with each scraping assembly 130.

As shown in FIG. 2, which is a section view along A-A, and in FIG. 3, which is frontal view of a scraping assembly 130 attached to the distal ends 128 of each of the second group 126 of the plurality of tines 114, the scraping assembly 130 may comprise a concave surface 132. In embodiments, the scraping assembly 130 comprises a concave surface 132 oriented away from a front face 146 of the head assembly 100.

In embodiments, a lower outer edge 136 of the scraping assembly 130 located opposite to the distal end 128 of the second group 126 of the plurality of tines 114 forms a portion of the lower edge 108 of the head assembly 100. In embodiments, the lower outer edge 136 of the scraping assembly 130 has a curved surface 138. In embodiments, the scraping assembly 130 has an overall circular or oval shape, which in embodiments is concave similar to an end of a spoon.

As shown in FIG. 4, in other embodiments, an alternative scraping assembly 130' comprises a planer surface, which in embodiments has a lower outer edge 136 which may include a chisel or knife edge 134.

Figure 5:
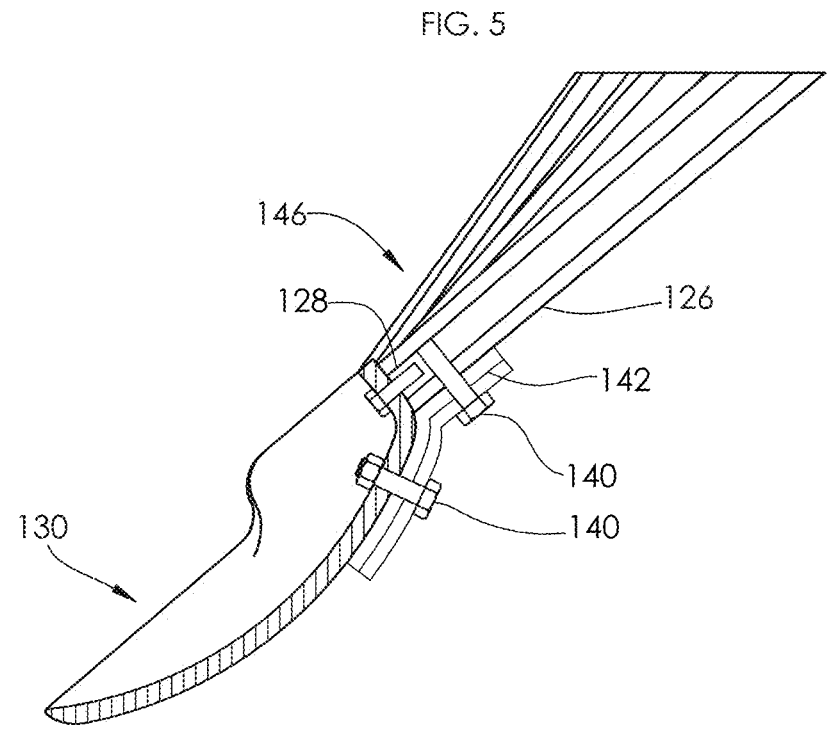
FIG. 5 is a cross-sectional view along A-A of FIG. 1 of an alternative embodiment having a removable scraping assembly.
Figure 6:
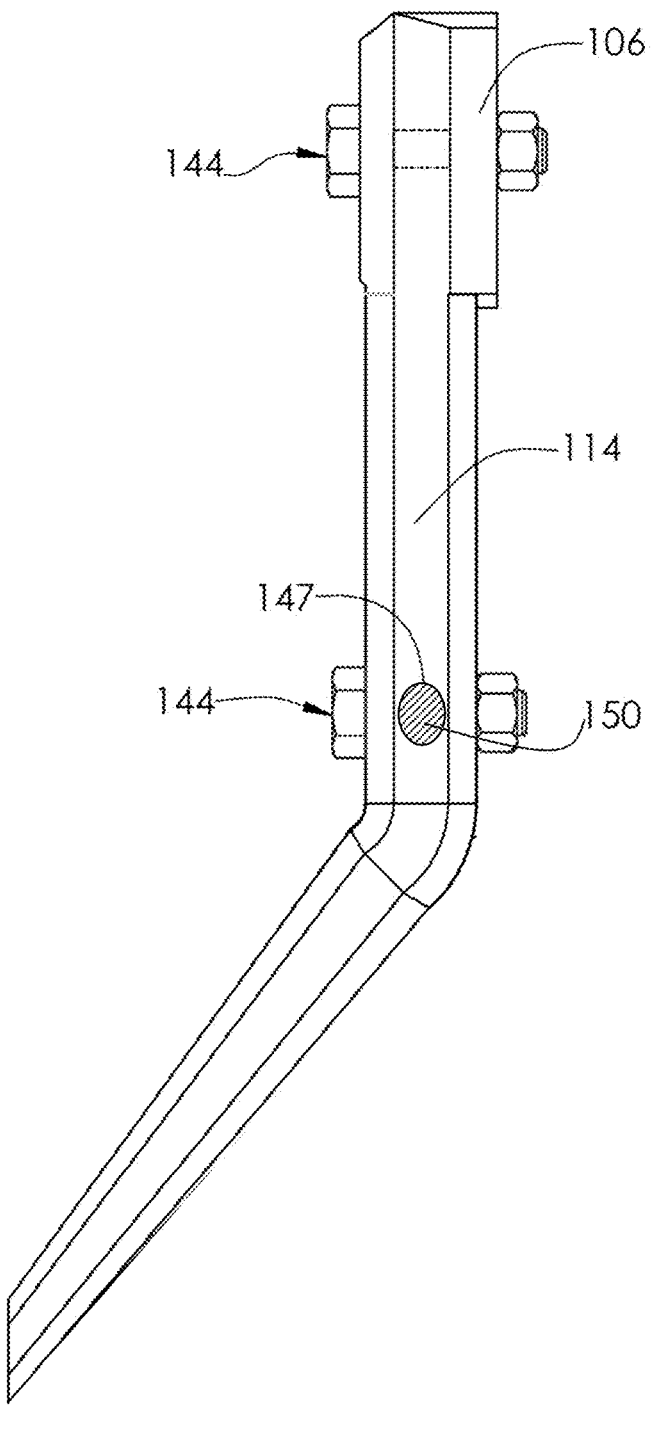
FIG. 6 is a cross-sectional view of a side of the head assembly having removable tines according to embodiments disclosed herein.

As shown in FIG. 5, in embodiments the scraping assembly 130 is releasably engaged, e.g., via a bracket 142 and/or threaded members 140, with the distal end 128 of the second group 126 of the plurality of tines 114. As shown in FIG. 6, in embodiments, one or more of the plurality of tines 114 are releasably engaged with the upper support 106 and/or with a second support 150 discussed below e.g., via a threaded member 144 or via a rod in slot arrangement e.g., the second support 150 disposed through an opening 147 in the tine 114. Accordingly, in embodiments, the scraping assembly 130 and/or one or more tines 114 may be replaced should they become worn or broken.

Figure 7:
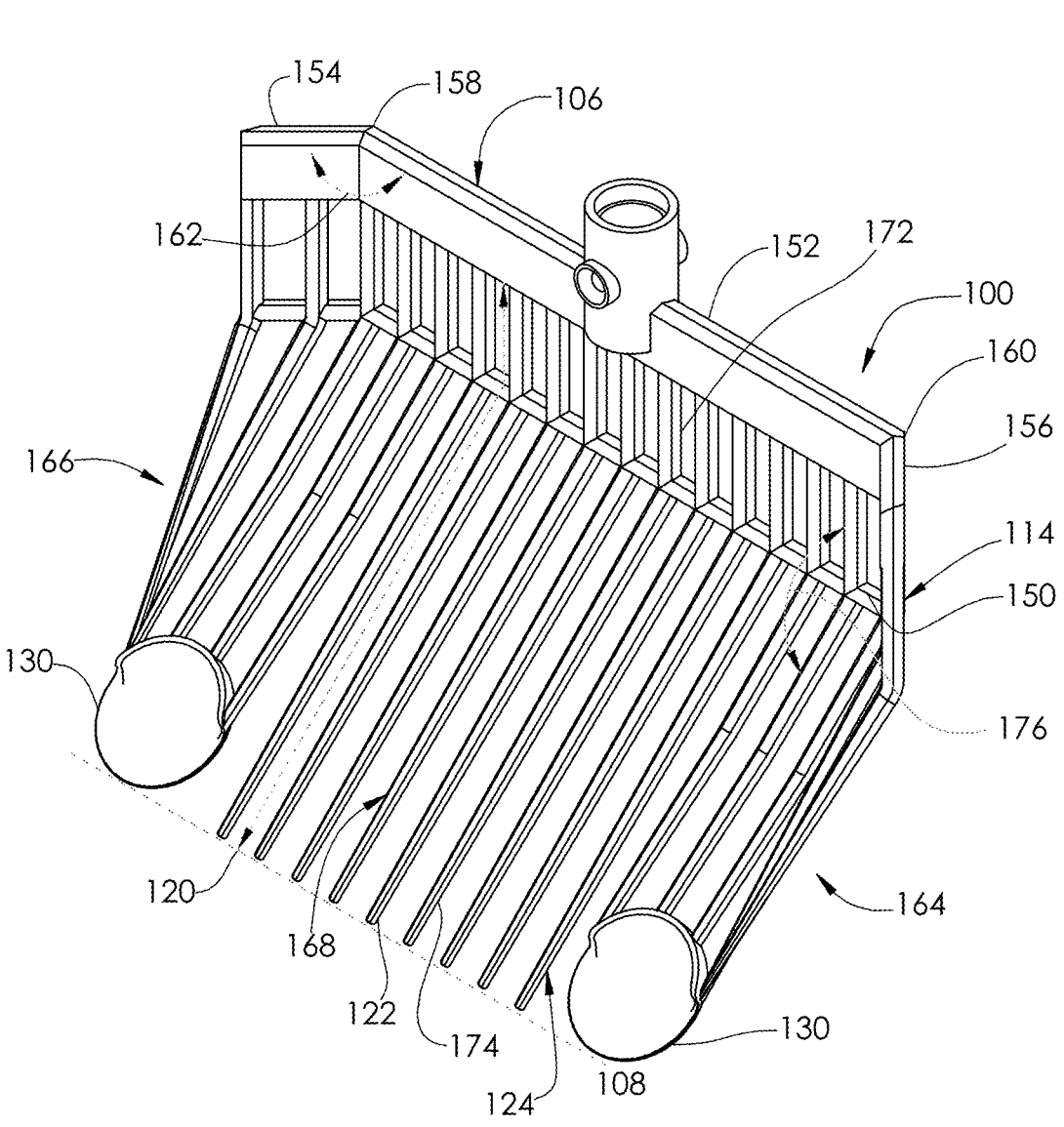
FIG. 7 is a perspective view of a head assembly according to embodiments disclosed herein.

FIG. 7 is a side down perspective view of a head assembly 100 according to embodiments disclosed herein. As shown in FIG. 7, in embodiments, the stall rake comprises a plurality of scraping assemblies 130. In some embodiments, at least two of the scraping assemblies 130 are located on opposite ends or sides i.e., side 164 and side 166 of the lower edge 108 of the head assembly 100. In embodiments, the upper support 106 includes a center portion 152 disposed between two outer portions 154 and 156. Each outer portion 154 and 156 is engaged with a corresponding first end 158 and second end 160 of the center portion 152, i.e., with first end 158 proximate to side 166 and second end 160 proximate to side 164. In embodiments, each outer portion 154 and 156 is oriented at an angle 162 relative to the center portion 152. In embodiments, the angle 162 is from about 90° to less than 180° In such embodiments, the head assembly 100 is arranged to form a scooping structure having an overall concave front face 168.

As depicted in FIG. 7 and elsewhere, in embodiments the head assembly 100 further comprises a second support 150 engaged with the plurality of tines 114, wherein the second support 150 is located between the upper support 106 and the lower edge 108 along the tine length 120. In embodiments, the second support 150 is oriented parallel to the upper support 106, and has essentially the same length, and is angled 162 in the same way as the upper support 106. In embodiments, one or more of the plurality of tines 114 comprise a first portion 172 disposed between the upper support 106 and the second support 150, and a second portion 174 disposed between the second support 150 and the lower edge 108. In embodiments, the second portion 174 is oriented at an angle 176 relative to the first portion 172. In embodiments, angle 176 is greater than or equal to about 90° and less than about 180°, further forming the scooping structure having an overall concave front face 168.

In embodiments, the elongated body portion 118 (see FIG. 1) of one or more of the plurality of tines 114 has a circular cross section. In other embodiments, the elongated body portion 118 of one or more of the plurality of tines 114 has an angular or triangular cross section. In other embodiments, the elongated body portion 118 of one or more of the plurality of tines 114 has a square, cross shaped, and/or rectangular cross section.

In embodiments, the distal end 122 of the first group 124 of the plurality of tines 114 comprises a frustoconical shape.

This may present as a terminal edge or point of the distal end having a blunted or rounded point, or may the terminal point may terminate in a sharpened point. In other embodiments, the distal end 122 of the first group 124 of the plurality of tines 114 comprises a chisel shaped terminal edge i.e., the terminal edge is tapered to form a flat plane or knife edge (not shown).

In embodiments, the head assembly 100 of the stall rake is engageable with an end of a handle 104. In other embodiments, the head assembly 100 includes a handle (i.e., the handle is not removable from the head assembly. In embodiments, the handle may have any form or shape from a simple linear structure, e.g., a broom handle, to a more complicated handle assembly such as those found on shovels or other hand implements and/or tools. Returning to FIG. 1, in embodiments, the upper support 106 comprises a receiver 102 and/or a hole disposed therethrough, dimensioned and arranged to frictionally engage the end of the handle 104, which in embodiments may include a threaded member or pin disposed through an attachment hole 178 disposed through the receiver 102. In other embodiments, the upper support 106 comprises a handle receiver 102 and/or a hole disposed therethrough, comprising threads (not shown) dimensioned and arranged to threadedly engage a corresponding threaded end of the handle.

In embodiments, at least a portion of the head assembly 100 is formed from metal. In embodiments, the head assembly is formed from steel, which may include stainless steel or other alloys. In still other embodiments, at least a portion of the head assembly 100 is formed from a polymeric material, e.g., a polyamide, a polyolefin, and/or the like, commonly referred to as "plastic" or "resin". In embodiments, some of the components of the head assembly are formed from metal and the others are formed from plastic.

The Applicant has discovered that a stall rake according to embodiments disclosed herein offers improved utility in removing both bedding and waste matter from animal enclosures. The scraping assemblies have been found to allow uninterrupted cleaning of disparate surfaces and/or disparate contaminants using the same tool without having to stop and use a different implement. The Applicant has further discovered the unexpected utility of scraping assemblies having a rounded lower edge and a concave structure over more planer assemblies. By locating the scraping assemblies at least at the outer ends of the stall rake, the user is able to angle and orient the device to gain access to areas otherwise impossible to reach with tools known in the art.

Furthermore, the combination of the upper and secondary supports has been observed to provide increased strength and contaminant removal ability relative to other designs known in the art.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

I claim:

1. A stall rake, comprising:
a head assembly attachable to an end of a handle,
the head assembly comprising an upper support separated from a lower edge by an assembly length;
the upper support having a length oriented transverse to the handle;

a plurality of tines engaged with the upper support, each spaced apart from one-another along the length of the upper support,
each of the plurality of tines having an elongated body portion extending away from the upper support along a tine length and terminating at a distal end,
wherein the distal end of a first group of the plurality of tines define the lower edge of the head assembly;
wherein the distal end of a second group of tines are attached to a scraping assembly extending between the distal end of the second group of tines and the lower edge of the head assembly.

2. The stall rake of claim 1, wherein the distal end of two or more of the second group of the plurality of tines are engaged with the same scraping assembly.

3. The stall rake of claim 1, wherein the scraping assembly comprises a concave surface.

4. The stall rake of claim 1, wherein a lower outer edge of the scraping assembly located opposite to the distal end of the second group of tines forms a portion of the lower edge of the head assembly, and wherein the lower outer edge of the scraping assembly has a curved surface.

5. The stall rake of claim 4, wherein the scraping assembly comprises a concave surface oriented away from a front face of the head assembly.

6. The stall rake of claim 1, wherein the upper support includes a center portion disposed between two outer portions, each outer portion engaged with a corresponding end of the center portion, wherein each outer portion is oriented at an angle relative to the center portion.

7. The stall rake of claim 1, wherein the distal end of the first group of the plurality of tines comprises a frustoconical shape.

8. The stall rake of claim 1, wherein the distal end of the first group of the plurality of tines comprises a chisel shaped terminal edge.

9. The stall rake of claim 1, at least two scraping assemblies, wherein two of the scraping assemblies are located on opposite ends of the lower edge of the head assembly.

10. The stall rake of claim 1, further comprising a second support engaged with the plurality of tines, wherein the second support is located between the upper support and the lower edge along the tine length.

11. The stall rake of claim 10, wherein one or more of the plurality of tines comprise a first portion disposed between the upper support and the second support and a second portion disposed between the second support and the lower edge, wherein the second portion is oriented at an angle relative to the first portion.

12. The stall rake of claim 1, wherein the elongated body portion of one or more of the plurality of tines has a circular cross section.

13. The stall rake of claim 1, wherein the elongated body portion of one or more of the plurality of tines has an angular or triangular cross section.

14. The stall rake of claim 1, wherein the elongated body portion of one or more of the plurality of tines has a square or rectangular cross section.

15. The stall rake of claim 1, wherein the upper support comprises a receiver having a hole disposed therethrough, dimensioned and arranged to frictionally engage the end of the handle.

16. The stall rake of claim 1, wherein the upper support comprises a handle receiver having a hole disposed therethrough, comprising threads dimensioned and arranged to threadedly engage a corresponding threaded end of the handle.

17. The stall rake of claim 1, wherein at least a portion of the head assembly is formed from metal.

18. The stall rake of claim 1, wherein one or more of the plurality of tines are releasably engaged with the upper support, wherein the scraping assembly is releasably engaged with the distal end of the second group of the plurality of tines.

19. A stall rake, comprising:

a head assembly attached to an end of a linear handle, the head assembly comprising an upper support separated from a lower edge by an assembly length; a second support oriented parallel to the upper support located between the upper support and the lower edge along the assembly length;

the upper support and the second support having a length oriented transverse to the linear handle;

a plurality of tines, each engaged with the upper support and the second support, each spaced apart from one-another along the length of the upper support and the second support, each of the plurality of tines comprising a first portion disposed between the upper support and the second support, and a second portion disposed between the second support and the lower edge, wherein the second portion is oriented at an angle relative to the first portion and terminates at a distal end of the tine;

wherein the distal ends of a first group of the plurality of tines defines the lower edge of the head assembly;

wherein the distal end of a second group of the plurality of tines are each attached to a scraping assembly extending between the distal end of the second group of the plurality of tines and the lower edge of the head assembly;

wherein the distal end of two or more of the second group of the plurality of tines are engaged with the same scraping assembly;

wherein a lower outer edge of the scraping assembly located opposite to the distal end of the second group of the plurality of tines forms a portion of the lower edge of the head assembly;

wherein the lower outer edge of the scraping assembly has a curved surface;

wherein the scraping assembly comprises a concave surface oriented away from a front face of the head assembly;

wherein the upper support and the second support each include a center portion disposed between two outer portions, each outer portion engaged with a corresponding end of the center portion, wherein each outer portion is oriented at an angle relative to the center portion;

wherein the head assembly comprises at least two cleaning assemblies;

wherein two of the cleaning assemblies are located on opposite ends of the lower edge of the head assembly, and wherein the upper support is frictionally engageable or threadedly engageable with the end of the linear handle.

20. The stall rake of claim 19, wherein one or more of the plurality of tines configured to be releasably engaged with the upper support or the second support; and/or wherein the scraping assembly is releasably engaged with the distal ends of the two or more of the second group of the plurality of tines.

\* \* \* \* \*